United States Patent [19]

Gallemore

[11] Patent Number: 4,476,520

[45] Date of Patent: Oct. 9, 1984

[54] COMPUTER-CONTROLLED SYNTHETIC WAVEFORM GENERATOR

[76] Inventor: Elbert M. Gallemore, 21502 St. John La., Huntington Beach, Calif. 92646

[21] Appl. No.: 351,805

[22] Filed: Feb. 24, 1982

[51] Int. Cl.³ .............................................. H02M 1/12
[52] U.S. Cl. .......................................... 363/43; 320/6; 323/906
[58] Field of Search .......................... 363/43; 323/906; 320/5–8, 1

[56] References Cited

U.S. PATENT DOCUMENTS

| | | |
|---|---|---|
| 870,688 | 11/1907 | Ringer . |
| 1,534,026 | 4/1925 | Burne . |
| 3,100,851 | 8/1963 | Ross et al. . |
| 3,324,376 | 6/1967 | Hunt . |
| 3,391,323 | 7/1968 | Ikeda ................................... 363/43 |
| 3,440,514 | 4/1969 | Fenley ................................... 320/6 |
| 3,928,791 | 12/1975 | Mullersman . |
| 4,129,817 | 12/1978 | Yew et al. . |
| 4,415,961 | 11/1983 | Harmon ................................ 363/43 |

OTHER PUBLICATIONS

Naaijer, "New Type of Transformerless High Efficiency Inverter," Conference Third E.C. Photovoltaic Solar Energy Conf., Cannes, France Oct. 27-31, 1980.
Naaijer, "Transformerless Inverter Cuts Photovolatiac System Losses," Electronics, vol. 53, No. 18, pp. 121-126.

*Primary Examiner*—William H. Beha, Jr.
*Attorney, Agent, or Firm*—Nilsson, Robbins, Dalgarn, Berliner, Carson & Wurst

[57] ABSTRACT

A method and apparatus for the efficient conversion of energy into electrical energy of a preselected character utilizes programmable control to direct the storage and supply of energy in the form of an electrical signal of predetermined waveform with maximum flexibility as to the choice of waveform. An EMF ring, comprised of a plurality of charge storage elements arranged in a ring-like configuration, provides a medium for charge storage. A plurality of computer controlled switches allows the connection of selected charge storage elements to at least one output line, a voltage reference having been established, to thereby supply an electrical signal of preselected waveform thereto. A generator is selectively coupled to one or more of the storage elements through the switches to provide an adaptive optimum charge storage pattern among the plurality of storage elements, enhancing the efficient conversion of an energy input such as solar radiation, wind or the like, into the electrical output of preselected waveform, such as alternating current, direct current or a combination of both.

17 Claims, 11 Drawing Figures

COMPUTER-CONTROLLED SYNTHETIC WAVEFORM GENERATOR

SUMMARY AND BACKGROUND OF THE INVENTION

The present invention relates to energy conversion (and storage) systems. More particularly, this invention pertains to transformerless systems for converting energy into electric power of a pre-selected character chosen in accordance with a desired application.

It has heretofore been known in the art to generate electrical energy from a variety of non-electrical modes of nature. In fact, many of such methods reflect relatively ancient technologies; others, though of more recent conception, often reflect primitive approaches to age old problems (e.g., efficiency, economy and durability) that are recognized as inherent shortcomings of such systems.

Often energy conversion systems as abovedescribed will utilize a plurality of energy storage means, such as batteries, to store electrical energy which has been derived from a non-electrical source. An example of such a system is disclosed in U.S. Pat. No. 2,148,804 of Claytor for "Electrical System for Wind Driven Generators" which was issued in 1939.

In producing useable electrical energy, it is essential that the ultimate form or character of the electrical energy generated be compatible with the intended ultilization system. For example, 400 cycle per second alternating current is required to drive some of the (utilization) systems employed in airplanes whereas 60 cycle per second alternating current is appropriate for households and direct current for television sets. On the other hand, differing sources of electrical energy are characterized by a variety of output voltage forms when such sources generate electrical energy. For example, while solar panels produce direct current, wind mills generate either direct or alternating current and water wheels generate direct or alternating current. The obvious incompatibilities of particular inputs with certain end uses limits the possibility of efficient utilization of certain natural energy resources, such as wind, sun and running water, whose abundance is often geographically limited, with respect to end uses that tend to be non-regional in character.

Numerous attempts have been made to synthesize or generate utilization waveforms of pre-selected character. Transformers, well-known in the electrical art, often comprise rather bulky plus heavy configurations, including a magnetic core, rendering the transformer suboptimal for certain classes of uses including, of course, those of an airborne character encountered with respect to airplanes, satellites, missiles and the like. Other methods and means for generating or synthesizing pre-selected waveforms are disclosed in U.S. Pat. No. 4,129,817 of Yew et al. for "Step Voltage Power Supply with Equalized Discharge of Battery Cells", U.S. Pat. No. 3,100,851 of Ross et al. for "High Power Synthetic Wave Form Generator", U.S. Pat. No. 3,391,323 of Ikeda for "High Efficiency Synthetic Wave Inverter", U.S. Pat. No. 3,440,514 of Finley for "Static Inverter" and U.S. Pat. No. 3,324,376 of Hunt for "Linear D.C. to A.C. Converter". The foregoing represent various systems and configurations for generating electrical signals of preselected character or form. Systems for charging storage elements such as batteries are disclosed in U.S. Pat. No. 1,534,026 of Burne for "Charging Secondary Batteries" and U.S. Pat. No. 3,928,791 of Mullersman for "Stand-by Power System".

None of the above-referenced systems discloses a fully flexible, efficient, integrated approach to energy conversion.

The present invention overcomes the above-referenced shortcomings of the prior art by providing a fully integrated, flexible, highly efficient and durable energy conversion system. This system includes subsystems for (1) generating electrical energy of a preselected character by means including computer control (2) storing the electrical energy produced by means of a conversion device such as a solar panel, windmill or the like in an optimum distribution among a plurality of storage elements and (3) tapping the electrical energy, in the form of stored electrical charge in a preselected, programmable manner to provide electrical energy of a predetermined character.

In its specific aspects, the present invention includes a system for converting force into electrical energy of a preselected character. To accomplish this end, there is provided a generator for producing electrical energy of a first character in response to the natural force. Charge storage means are utilized that include a plurality of charge storage elements. A first bus of at least one conductor provides an electrical path between the output of the generator and the charge storage means while a second bus of at least one conductor is in electrical connection with the charge storage means. A switching network controls the flow of electrical energy from the first bus to the charge storage elements of the charge storage means and from the charge storage elements to the second bus. A programmable apparatus is provided to control the switching network.

In a further aspect, the invention comprises apparatus for generating electrical waveform(s) of preselected character. The apparatus of this subsystem includes an output port comprising at least one pair of conductors. Means comprising at least one charge storage element, are provided for storing electrical energy. Programmable apparatus is provided for coupling the charge storage elements to the output port in accordance with a preselected programmed sequence so that an electrical waveform of preselected character is produced at the port.

An additional inventive aspect relates to a switching network for controlling the discharging of an array of charge storage elements onto a first bus comprising a first set of conductors and the charging of the elements by current carried on a second bus comprising a second set of conductors in response to control words generated by means of a digital computer. The switching network includes a plurality of conductors to interconnect the charge storage elements and to connect the elements to the sets of conductors. Series closure switches are positioned to regulate electrical coupling between adjacent charge storage elements. Data switches are positioned to regulate the flow of current between charge storage elements and the conductors of the first and second buses. Means are provided for decoding the control word into a plurality of control signals and for transmitting the control signals to the switches.

In a final aspect, the present invention comprises a method for generating an electrical signal having a waveform of preselected character. The method includes, as a first step, arranging a pluality of charge storage elements into a ring-like configuration. A switchable connection is provided between each pair of charge storage elements. A plurality of conductors is arranged as an output port and a switchable connection is provided between each of the switchable connection is provided between each of the charge storage elements and the conductors. The switches are programmably controlled according to a preselected switching sequence so that a preselected sequence of connections is made between the charge storage elements and the conductors. A time delay is programmably associated with each of the connections to provide an electrical signal having a waveform of preselected character at the output port.

The foregoing and additional aspects, features and advantages of the present invention will become evident from the detailed description thereof which follows. This description is accompanied by and provides an index to drawings in which like characters refer to like features of the invention throughout.

DETAILED DESCRIPTION

Figure 1:
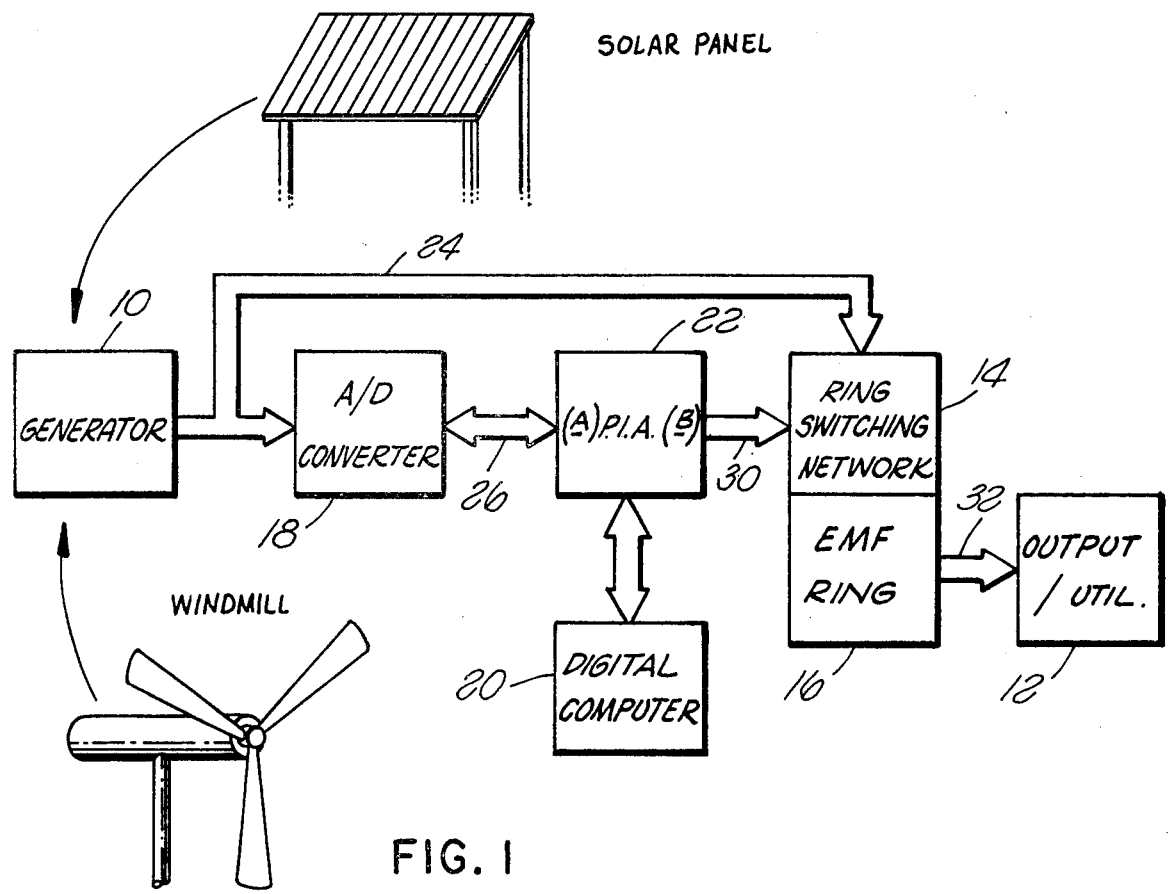
FIG. 1 is a schematic diagram of the energy conversion system of the present invention.

FIG. 1 is a schematic diagram of an energy conversion system according to the present invention. An electrical energy generator 10, which may comprise any of a number of conventional means for converting natural or other power into electrical energy serves as a means of withdrawing energy from the environment and providing, in response thereto, an input of electrical character for the system. The generator 10 may comprise, for example, means for converting running water into electrical energy (i.e. a water wheel or other hydroelectric generator), means for converting wind power into electrical energy (e.g., a wind mill), means for converting the radiative energy of the sun into electricity (a solar cell or panel of such cells) or sources of electrical energy. As is well known and has been discussed, various transducers of natural power into electrical energy leave a characteristic imprint upon the electrical energy produced. That is, alternating current generated by one of such means may be characterized by a naturally occurring frequency or variances in the direct current amplitude produced by such means may possess a characteristic configuration. It is an essential feature of the present invention that the eventual output of the overall energy conversion system is not so limited; rather, regardless of the natural source of the electrical energy utilized and the physical means by which the natural power is harnessed (i.e. the generator 10), the invention is capable of efficiently producing electrical energy therefrom of a predetermined character, selected, preferably, in accordance with a specific end use.

The desired character of the electrical energy produced by the system of FIG. 1 is selected in accordance with the requirements (fixed or variable) of an output-/utilization device 12. The system performs a conversion of the electrical energy produced by the generator 10 into electrical energy of a character compatible for usage by the device 12. It is a further characteristic and advantage of the present invention that the generator 10 and the utilization device 12 may each comprise multiple means for generating and for utilizing energy, respectively. That is, as will be seen below, the generator 10 may include, for example, means for producing electrical energy of a first character, such as alternating current, from a first natural source combined with means for producing electrical energy of a second character, such as direct current, from a second natural or other source and the utilization device 12 may include one or more devices that require direct current, combined with one or more devices that require alternating current of multiple frequencies and/or amplitude patterns.

The electrical energy produced by the generator 10 is applied, in analog form, through a ring switching network 14 which, under computer control, regulates the charging and discharging of a plurality of charge storage elements that comprise an EMF ring 16. The output of the generator 10 is simultaneously utilized in the generation of the control signals that are applied to the ring switching network 14. In this regard, the output of the generator 10 is applied to an analog-to-digital converter 18 wherein the analog waveform of the output of the generator 10 is sampled, in accordance with the internal clock of a digital computer 20, and converted to binary form. The digital binary representation of the output of the generator 10 is applied to a peripheral interface adapter (hereinafter "PIA") 22. The PIA 22 provides the buffer between the digital computer 20 and the rest of the system whereby data, in particular the electrical energy output of the generator 10, is continually accepted and evaluated by the computer 20 and a plurality of control signals generated in response to the values thereof are computed and thereafter applied to the system. In an actual embodiment of the present invention wherein a D-5 computer, manufactured by the Motorola Corporation of Phoenix, Ariz. was employed, a 6821 peripheral interface adapter, also manufactured by Motorola, served as the system PIA 22. This model PIA includes six registers and two 8-bit ports, an input port denominated "A" and an output port denominated "B". In the detailed discussions of the input and output functions and of the relationship of the PIA 22 to the remainder of the system, the "A" port and "B" port terminology of the 6821 peripheral interface adapter will be employed for purposes of exposition. The invention is by no means limited to such configuration. For example, computer 20 may receive relevant data concerning both inputs and outputs in the form of tri-state data.

A plurality of data buses, the contents of which derive from either the output of the generator 10 or from the operations of the computer 20, link and provide communication between various elements of the system. The (analog) electrical waveform porduced by the generator 10 is applied, via the branched generator bus 24 to the analog-to-digital converter 18 and to the ring switching network 14. Insofar as the output of the generator 10 is provided to the switching network 14, the charge transfer bus 24 provides a charge transfer path between the output of the generator 10 and the plurality of charge storage elements of the EMF ring 16. As applied to the analog-to-digital converter 18, the output of the generator 10 is simultaneously utilized, after conversion to digital form, to provide data to the computer 20 for use in the generation of control signals directing the charging of selected ones of the charge storage elements of the EMF ring 16 by directing the states of the switches of the ring switching network 14.

The sampled output of the converter 18, in binary format, is applied to the "A" or input port of the PIA 22 over the bi-directional transmission bus 26. An internal bi-directional bus 28 provides communication between the computer 20 and its interface unit or PIA 22. Incoming digital data representative of the energy production of the generator 10 is applied therethrough to the computer 20 for evaluation in accordance with the programmed functions thereof. The control functions derived within the computer 20 in response to the input intelligence are then applied to the PIA 22 for transmission to the remainder of the system.

The control signals derived by the computer 20 are directed to the ring switching network 14 over a bus 30. The ring switching network 14, disclosed in greater detail below, is thereby directed to perform the functions which charge the individual charge storage elements of the EMF ring 16 and discharge selected elements of the ring 16 to form the desired output waveform(s). The waveform(s) produced thereby is (are) transmitted to the output/utilization device 12 over an output bus 32.

Figure 2A:
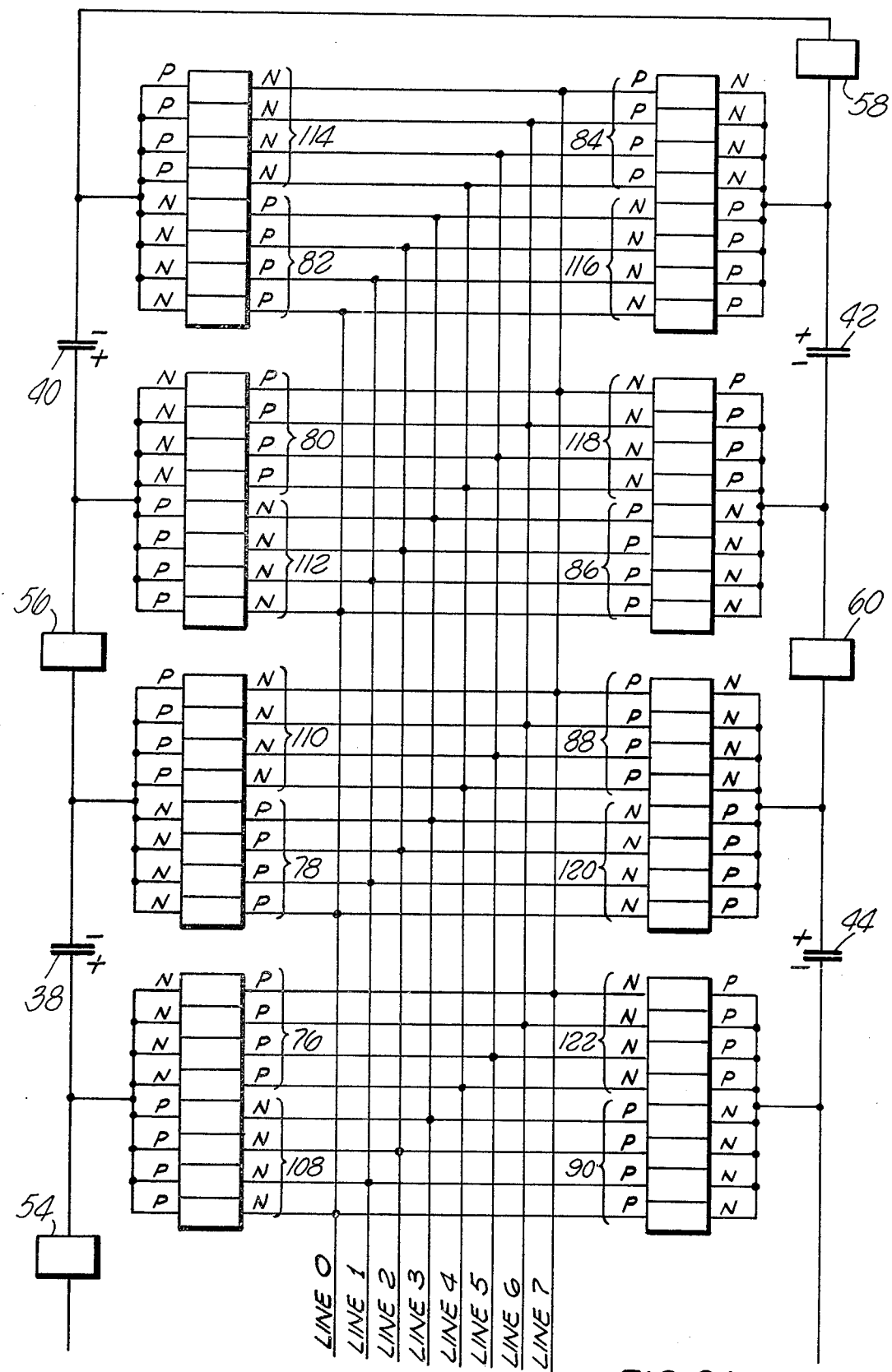
FIGS. 2a and 2b present a detailed circuit diagram of one possible EMF ring.
Figure 2B:
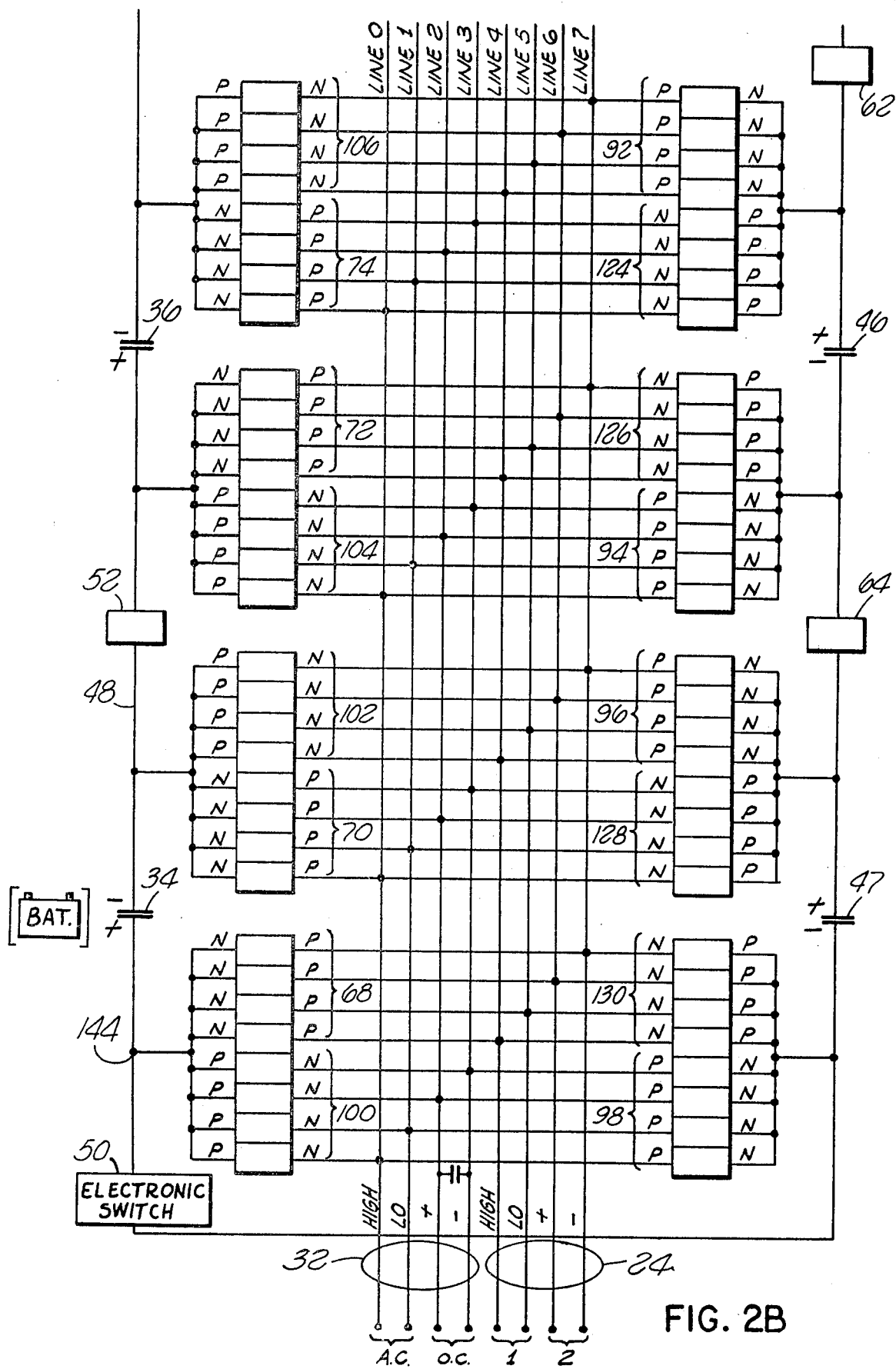

Frequent reference having been made to the plurality of charge storage elements comprising the EMF ring 16, a ring according to the present invention is disclosed in FIGS. 2a and 2b. The ring configuration of FIGS. 2a and 2b is one adapted to an energy conversion system wherein two separate output waveforms of predetermined character are generated from energy provided by a generator 10 which supplies electrical energy of two distinct characters to the system. The ring 16 includes eight charge storage elements 34, 36, 38, 40, 42, 44, 46 and 47 located in its perimeter. A common conductor 48 provides electrical connection therebetween. The charge storage elements are shown in the Figures as polarized capacitors; alternatively, they may be other charge storage means including but not limited to batteries or nonpolarized capacitors, for instance as indicated by the illustration in the bracket in FIG. 2B adjacent capacitor 34.

Interspersed between each adjacent pair of charge storage elements is one of a plurality of "series closure" switches 50, 52, 54, 56, 58, 60, 62 and 64 joined by the conductor 48. Each series closure switch is addressable and thus controlled by means of the programmable digital computer 20 through instructions provided in a "control word" format discussed infra.

The series closure switches and charge storage elements are thus serially connected at the perimeter of the EMF ring 16 through the conductor 48. Banks of eight (8) "data" switches each provide switchable electrical paths between the sixteen circuit nodes therebetween in the ring perimeter formed by the conductor 48 to eight lines, four of such lines comprising the charge transfer bus 24 and the remaining four comprising the output bus 32. As will be seen, a preselected (in regard to frequency) a.c. output is programmed to be provided across one pair of conductors comprising the output bus 32 (lines "0" and "1") and a preselected d.c. output is programmed to be taken across the other pair (lines "2" and "3") in the embodiment disclosed herein. Electrical energy is supplied to the charge storage elements of the ring from a first charging source (on lines "4" and "5") and from a second charaging source (across the second pair of lines "6" and "7").

Each bank of eight data switches is divided into four "positive feed units" and four "negative feed units". For consistency of notation, units of four negative feed units each are indicated at 68, 70, 72, 74, 76, 78, 80, 82, 84, 86, 88, 90, 92, 94, 96 and 98 while units of four positive feed unit data switches each are indicated at 100, 102, 104, 106, 108, 110, 112, 114, 116, 118, 120, 122, 124, 126, 128 and 130. Each data switch provides, in accordance with polarity and relative position in the EMF ring 16, one of two system functions. In the event it is an "output" data switch, it regulates the electrical path from one side of a charge storage element to one of the conductors forming the output bus 32. "Charging" data switches regulate electrical connection between a side of a charge storage element and one of the conductors forming the charge transfer bus 24.

Figure 3:
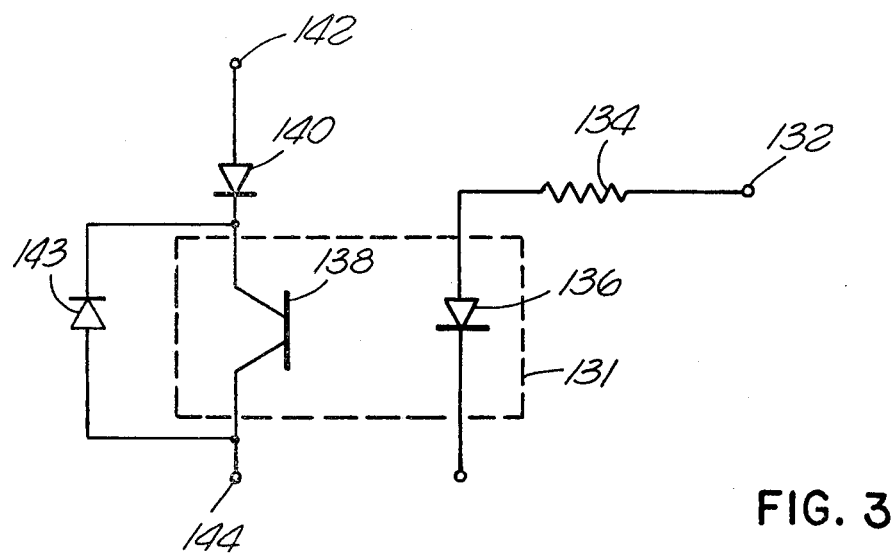
FIG. 3 is a circuit diagram for an individual series or data switch of the ring switching network.

Referring for the moment to FIG. 3, there it is shown, in schematic representation, a low power opto-isolated switching unit appropriate for incorporation into the present invention as either a series closure unit or a data switch of negative feed unit or positive feed unit classification. The switching unit 131 may comprise a 4N 30 Optoisolator I.C. Chip manufactured by Motorola. A current limiting resistor 134 is interposed between a port 132 and a light emitting diode 136 of the chip 131. A photosensitive transistor 138 is driven to conduction by the emission of photons from the LED 136. An optional diode 140 may be provided between the transistor 138 and a port 142. Power level multiplication devices, such as Darington transistor, may also be bridged across the photosensitive transistor 138. Diode 143 provides reverse voltage protection. As mentioned, the basic unit can be used as either a series closure switch or a data switch within the EMF ring. The transistor in the optoisolator chip 131 is non-conductive when no data input is applied to the terminal. When used as a series closure unit, the port 142 is connected to the positive output of a charge storage element and the terminal 144 is connected to the negative side of the adjoining charge storage element. The circuit is adapted for use as a positive feed unit (output) data switch by connection of the port 142 to the positive side of a charge storage element and of the terminal 144 to a preselected output line (such as one of lines "0" or "1" in the event the switch is to be utilized in the generation of a.c. output or one of lines "2" or "3" in the event the switch is to be utilized in the generation of d.c. output.) Finally, the unit serves as a negative feed unit (output) data switch when the terminal 144 is connected to the negative side of a charge storage element and the port 142 is connected to a selected output line. As mentioned above, data switches are configured as either "output" switches or "charging" switches in accordance with their polarities and locations in the EMF ring. According to the notation previously adopted with respect to FIGS. 2a and 2b, four positive (output) feed units are paired with four negative (charging) feed units or vice versa in each bank of eight data switches to provide system flexibility that allows both the flow of charging current and the discharge of the charge storage elements in accordance with control signals generated by the computer 20. In connecting the switch of FIG. 3 as a charging data switch, the terminal 142 is connected to one of the charging source input lines (i.e. one of lines "4", "5", "6" or "7") comprising the charge transfer bus 24. In the event that the positive side of the storage element is to be connected, the terminal is connected to the circuit node of conductor 48 adjacent the positive side of the charge storage element. In the event that the negative side of a storage element is to be connected, the terminal 144 is connected to the selected conductor of the bus 22 and the terminal 142 is connected to the node of the conductor 48 adjacent the negative side of the charge storage element. In the foregoing manner, by an appropriate sequence of control signals activating the light emitting diodes of the optoisolated switches, (1) the eight (8) series closure switches that are arranged about the periphery of the EMF ring are selectively opened and closed and (2) the thirty-two (8×4) negative and thirty-two (8×4) positive feed unit (output) data switches are opened and closed to direct the transfer of charge from selected ones of the eight (8) charge storage elements to one or more of the lines comprising the output bus 32 to provide a resultant output waveform of a preselected character and, further, (3) the thirty-two (8×4) negative and thirty-two (8×4) positive feed unit (charging) data switches are opened and closed, under the direction of the digital computer 20, to regulate the conduction of charging current from the bus 24 to a selected number of elements of the ring. Direct current charging input, (times 6+7) and alternating current charging input, (lines 4+5), can be physically interchanged without consequence. As will be seen from the discussion to follow, the charging process is undertaken during delays built into the programmed computer operation. Electrical energy production from the generator 10 is monitored at the computer 20 and thereafter the optimum number of charge storage elements to share the charging current is determined for maximum energy transformation efficiency.

Further discussion of the system requires a brief explanation of the "control word" format. The operation of the system is directed by the digital computer 20 in accordance with the monitored output of the generator 10 and with requirements of the output/utilization device 12. The control word in this example is an eight bit representation or coding of a switch of the ring switching network. The control word is capable of designating each switch and thereby moving the designated switch to an "open" or a "closed" position. The first three bits of the word designate a charge storage element. This three bit segment allows one to assign a unique number to each of the eight charge storage elements of the ring. Choosing a notation in which the charge storage elements are numbered consecutively in a clockwise manner beginning with the element 34 as shown in FIG. 2b, the following correspondence exists between the charge storage elements as previously defined and their three digit binary representations: element 34 (000); element 36 (001); element 38 (010); element 40 (011); element 42 (100); element 44 (101); element 46 (110); and element 47 (111).

The fourth bit of the 8-bit control word indicates the polarity, or side, of the charge storage element that is to be connected. For this purpose, a "1" indicates the positive side while a "0" indicates the negative side of the element. The fifth, sixth and seventh elements of the control word indicate the line number to be connected. Once again, three binary digits allows one to identify one of eight lines comprising the output bus 32 (4 lines) and the charge transfer bus 24 (4 lines). In the event that an a.c. output mode is to be switched, the appropriate fifth, sixth and seventh digits of the control word are either 000, or 001. For a d.c. output, the digits are 010 or 011. The routing of charging current from charging source 1 is accomplished by means of the digits 100 or 101 while the routing of current from charging source 2 is indicated by either 110 or 111, the foregoing combinations being the line designations as indicated on FIGS. 2a and 2b for the lines "0" through "7" respectively. The final digit of the eight-bit control word indicates the type of switch that is to be activated. A "0" indicates that the switch is a data switch while a "1" indicates a series closure switch. In the event that a series closure switch is indicated, its location is specified in relation to the adjacent charge storage element.

Summarizing the above, the system controls switching functions through the use of an eight-bit control word defined as follows:

| $D_0 D_1 D_2$ | $D_3$ | $D_4 D_5 D_6$ | $D_7$ |
|---|---|---|---|
| CHARGE STORAGE ELEMENT (0-7) | POLARITY 1 = Positive 0 = Negative | LINE NO. (0-7) | SWITCH TYPE 0 = DATA 1 = SERIES |

Figure 4A:
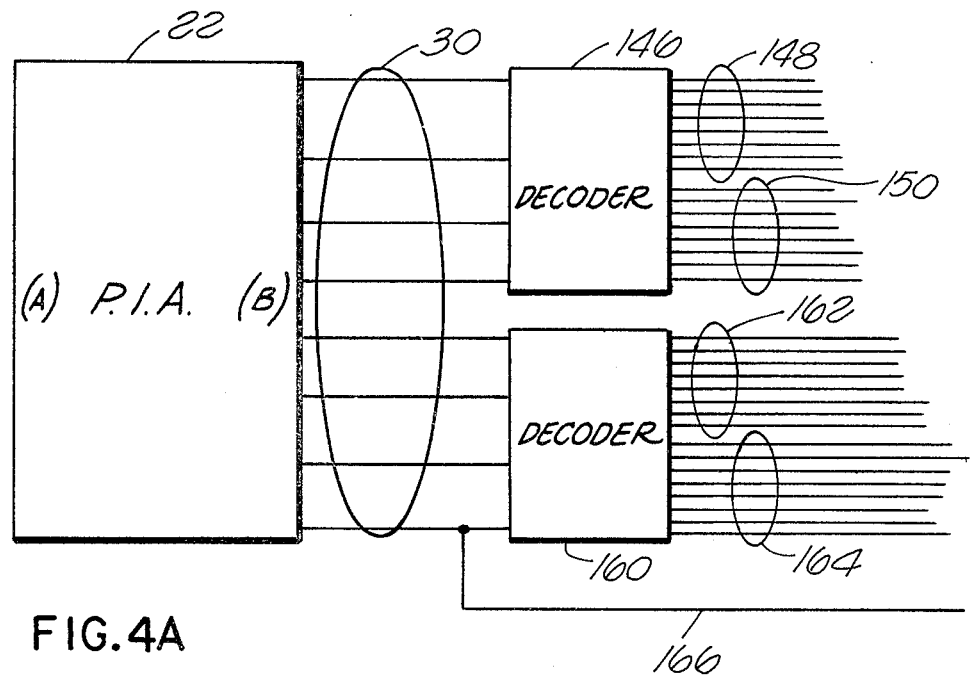
FIGS. 4a through 4c present detailed schematic diagrams of circuitry associated with the ring switching network of the invention.
Figure 4C:
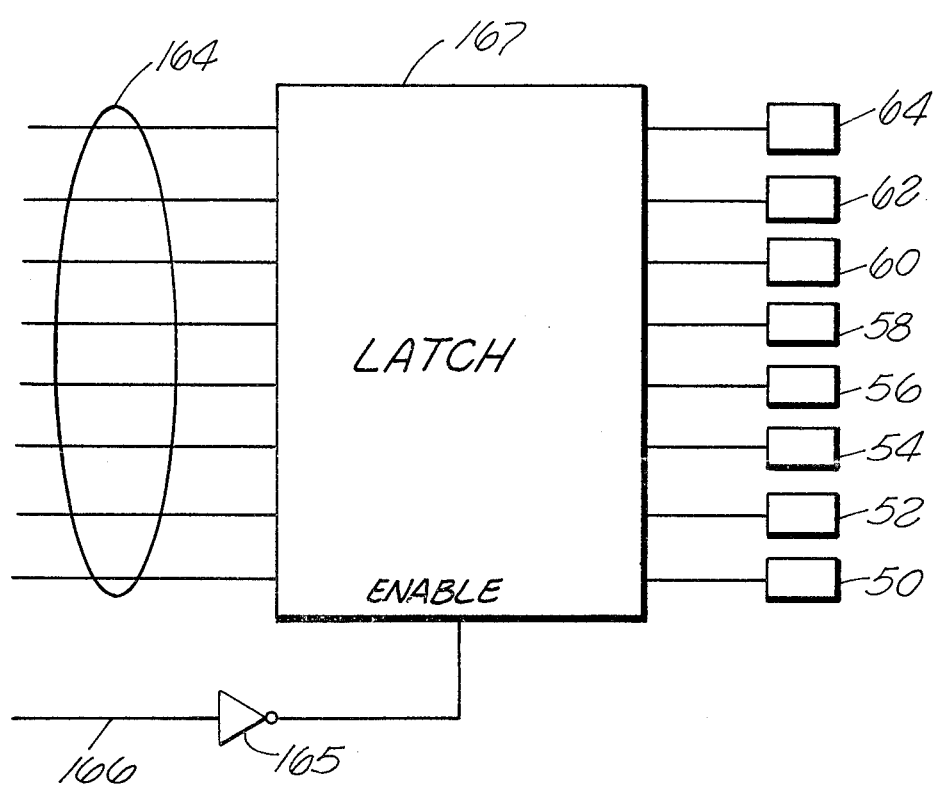
Figure 4B:
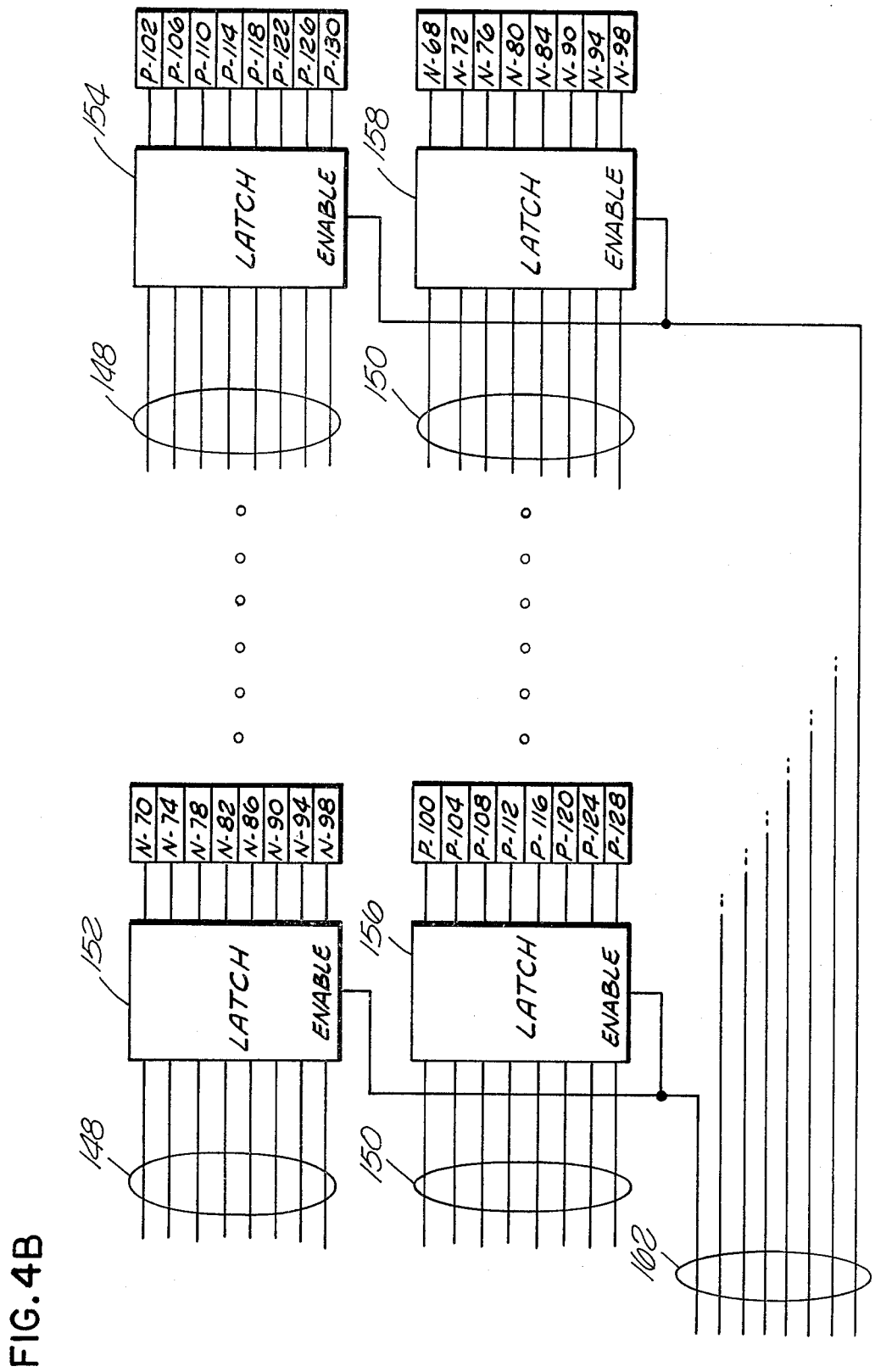

FIGS. 4a through 4c present a detailed schematic diagram of the ring switching network 14. The network 14 serves to transmit appropriate switching signals to the EMF ring 16 in accordance with the control words derived by the computer 20. In FIG. 4a the output or "B" port of the PIA 22 is seen to comprise eight outputs which are transmitted therefrom in parallel to the ring switching network 14 over the bus 30. The eight parallel outputs of the PIA 22 represent the eight digits of a switch-defining control word of the format as above described. Proceeding from top to bottom of the "B" port of the PIA 22, it is seen that the first four bits of the control word are applied to an EMF decoder 146. The decoder, which may be a 74 LS 154 manufactured by Texas Instruments performs a binary-to-hexadecimal conversion whereby its four parallel inputs, which designate one of the eight charge storage elements of the ring and a side or polarity thereof, are transformed into sixteen parallel outputs. The sixteen parallel outputs correspond to the sixteen possible pieces of information conveyed by the first four digits of the control word (i.e. eight different charge storage elements, each of which has two sides or polarities). Since only one side of one charge storage element is designated by a control word, fifteen of the sixteen outputs of the decoder 132 have a state ("high" or "low") that differes from the state of the designated output. In the event that positive logic were employed, the fifteen outputs would be low or grounded while the designated output would be high. In the event that negative logic were employed, only the designated output would be low.

The sixteen outputs of the EMF decoder 146 comprise two eight-bit buses 148 and 150, the outputs of the bus 148 relating to the negative sides of charge storage elements and those of bus 150 relating to the positive sides of charge storage elements. In FIG. 4b it can be seen that each conductor of the bus 148 is applied to grouping of eight latches including latches 152 and 154 while those of the bus 150 are applied to a grouping of eight latches including latches 156 and 158. They are paired into eight "groups", latches 152, 156 and latches 154 and 158, sharing common "enable" signals. Eight pairs of such latches are provided, the eighth pair being indicated at 154, and 158. Each pair shares a common enable signal. A 74116 manufactured by Texas Instruments, provides adequate performance as a latch for use in the invention.

The final four bits of the control word are applied as parallel signals from the "B" port of the PIA 22 to a line feed decoder 160 shown in FIG. 4a. The line feed decoder may be a 74LS154 manufactured by Texas Instruments, a binary-to-hexadecimal converter whereby the information at its four input bits is converted into a signal output upon one of sixteen parallel conductors.

The portion of the control word applied to the decoder 160 includes information defining the line, either for transmission of charging current (the bus 124) or for signal output (the output bus 132), to be connected to a charge storage element of the EMF ring 16. In addition, the final digit of the control word defines the type of switch, a "data" switch or a "series" switch, to be activated. Thus, the information applied to the line feed decoder 160 contains the identification of one of the eight lines comprising the combined buses 124 and 132 and one of the two types of switches used throughout the system, a possibility of sixteen different bytes. The first eight outputs of the decoder 160 (proceeding from top to bottom) comprise a bus 162 of line identifications characterized by "0" in the position of the eighth or last bit of the control word while the ninth through sixteenth parallel outputs of the decoder 160 comprise a bus 164 of line identifications characterized by "1" in the eighth position. Thus, the first eight outputs of the decoder 160 identify data switches while the latter eight parallel outputs identify series switches. (It is important to keep in mind that, while locations and functions are identified with respect to the positions of non-switch elements of the EMF ring 16, the controllable elements are limited to the switches of the network 14 associated therewith.)

As mentioned, and as illustrated in FIG. 4b, eight parallel outputs of the EMF decoder 146, comprising the bus 148, are applied to the latch 152 while the remaining eight outputs of the decoder 146, comprising the bus 150, are applied to the latch 156. The latches 152, 156 are "paired" in the sense that they share a common enable signal. Eight such pairs of latches are provided, the eight pair comprising the latches 154 and 158. Each of the eight parallel inputs to the "top" latches, as indicated in FIG. 4b, indicates the negative side of one of the eight charge storage elements of the EMF ring 16 while each of the eight parallel inputs to "bottom" latches indicates the positive side of one of its eight charge storage elements.

The enable signals that gate the paired latches are derived from the first eight parallel outputs of the line feed decoder 160 comprising the bus 162. As discussed, each of these outputs indicates data switch type and one of the lines comprising the combined buses 124 and 132. Each of the eight components of the bus 162 is applied, as an enable, to one of a pair of the abovereferenced "top" and "bottom" latches disclosed in FIG. 4b. This circuitry effects a combination of inputs and enable signals whereby any data switch may be uniquely located, activated and latched. Each pair of latches indicates both sides of each charge storage element of the ring 16 while the eight enable signals applied thereto indicate the four "input" lines of the bus 124 and the four "output" lines of the bus 132. In effect the eight paired latches represent a matrix associating all of the relevant locations internal to the ring 16, at each of which points there is located a controllable switch, with all possible inputs and outputs thereof.

The outputs of paired latches are applied to data switches grouped according to location by (1) the sign (positive or negative) of the side of the charge storage element to which it supplies charging current and/or from which it is discharged and (2) the line to which the switch connects. Thus, in FIG. 4b it is seen that the output of the latch 152 is fed in parallel to the eight switches that connect the negative side of a charge storage element to line "0" while the eight outputs of the latch 156 control the eight data switches that connect the positive side of a charge storage element to line "0". (Data switches are indicated in FIG. 4b by type, N (negative feed unit) or P (positive feed unit) and the grouping of four switches, indicated in FIGS. 2a and 2b, in which it is positioned. The exact one of the four switches designated may be determined by matching the line connection of the switches fed by a given latch with the line connection of the particular switch of the group.) Subsequent groupings of data switches are defined by proceeding sequentially through line number "7" as indicated in FIGS. 2a and 2b. Latches 154 and 158 control the switches defined with respect to line 7, the upper grouping of switches connecting the negative sides of charge storage elements to line 7 and the lower grouping of switches connecting the positive side of a charge storage element to this line.

It may be noted that, while the upper latch 152 controls negative feed units and the lower latch 156 controls positive feed units, the upper latch 154 and the lower latch 158 control data switches of opposite character. This reflects the fact that, as may be seen with reference to FIGS. 2a and 2b, four of the data switches of each bank of eight switches are positive feed units and four are negative feed units. Negative feed units connect the negative sides of charge storage elements and positive feed units connect the positive sides of charge storage elements to the output bus 32 exclusively. "Cross-polarity" connections, which reflect the flow of charging current to a charge storage element, are made exclusively to the charge transfer bus 124. Thus, assuming a sequential progression through the eight lines, the first four upper latches control "output" switching and the remaining upper latches control "charging". The reverse relationship applies with respect to the lower latches.

In the event that the final digit of the control word is a "1", none of the data switches is activated. The last or bottom eight outputs of the decoder 160, having "1" as the last bit of the control word (indicating a series switch), are applied directly to the latch 164, the eight parallel outputs of which are gated by the eighth or last bit of the control word from the PIA 22 as transmitted by a conductor 166. Before application to latch 164, the signal on line 166 is applied to an inverter 165 a 74L500 NAND gate manufactured by Texas Instruments of Dallas, Tex. The output of the gate 165 may be applied to the "clear" parts of the latches to perform the corresponding function. The outputs of the above-mentioned latch 164 are applied to the series closure switches 50, 52, 54, 56, 58, 60, 62, and 64 respectively so that, as in the case of the aforementioned data switches, any switch indicated by control word can be deactivated upon command. It should be noted that a series of control words is generated according to the methods to be disclosed with respect to FIGS. 5a through 5c and 7a and 7b. Thus, in operation, a series of words is produced at accordance with the method of the invention whereby are sequentially deactivated to perform the functions of charging and discharging the storage elements to provide efficient energy conversion.

Figure 5:
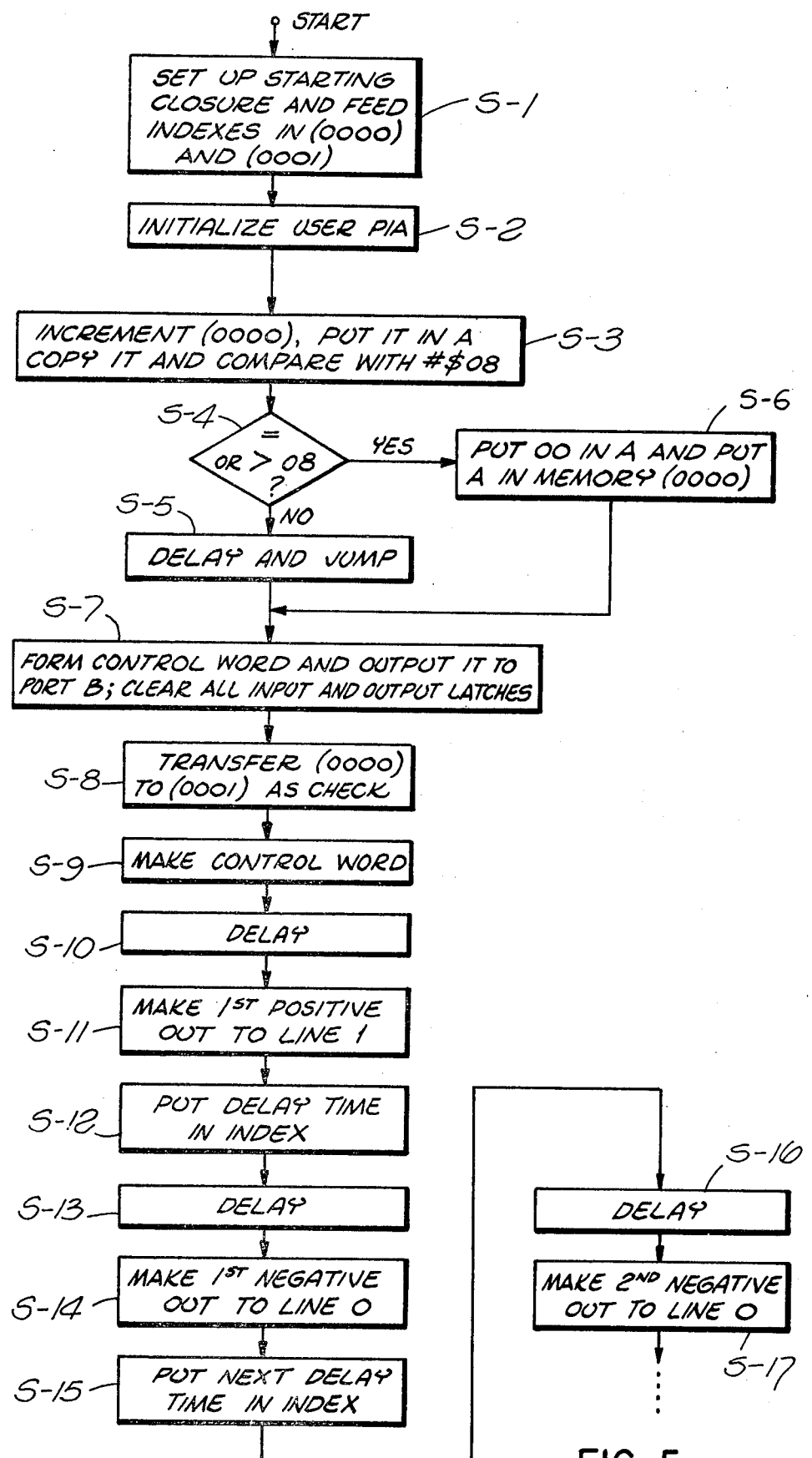
FIG. 5 is a flow chart diagram of the method for generating an output electrical waveform according to the invention.
Figure 7A:
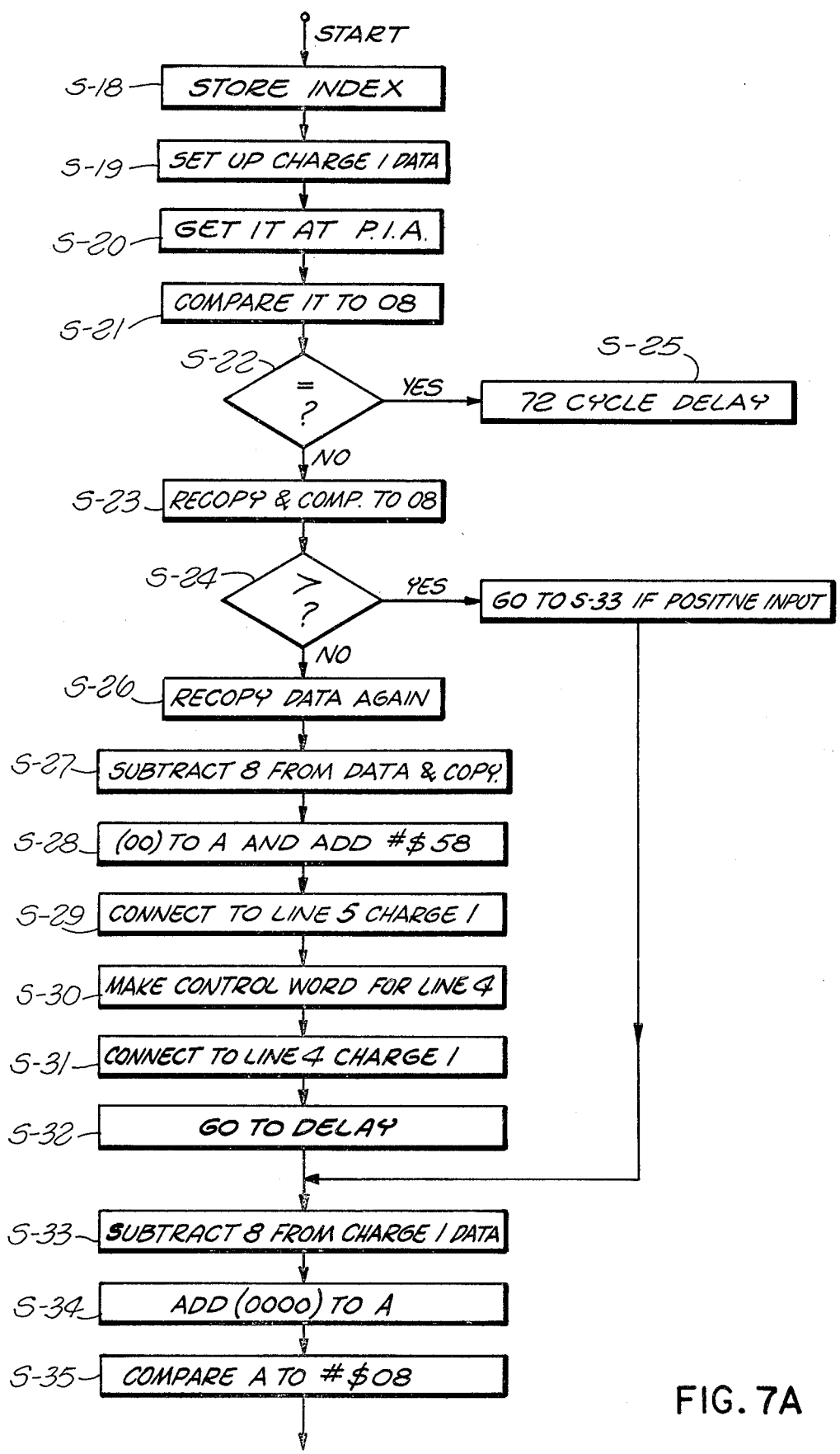
FIGS. 7a and 7b present a flow chart of the "delay" subroutine for recharging the charge storage elements of the EMF ring.
Figure 7B:
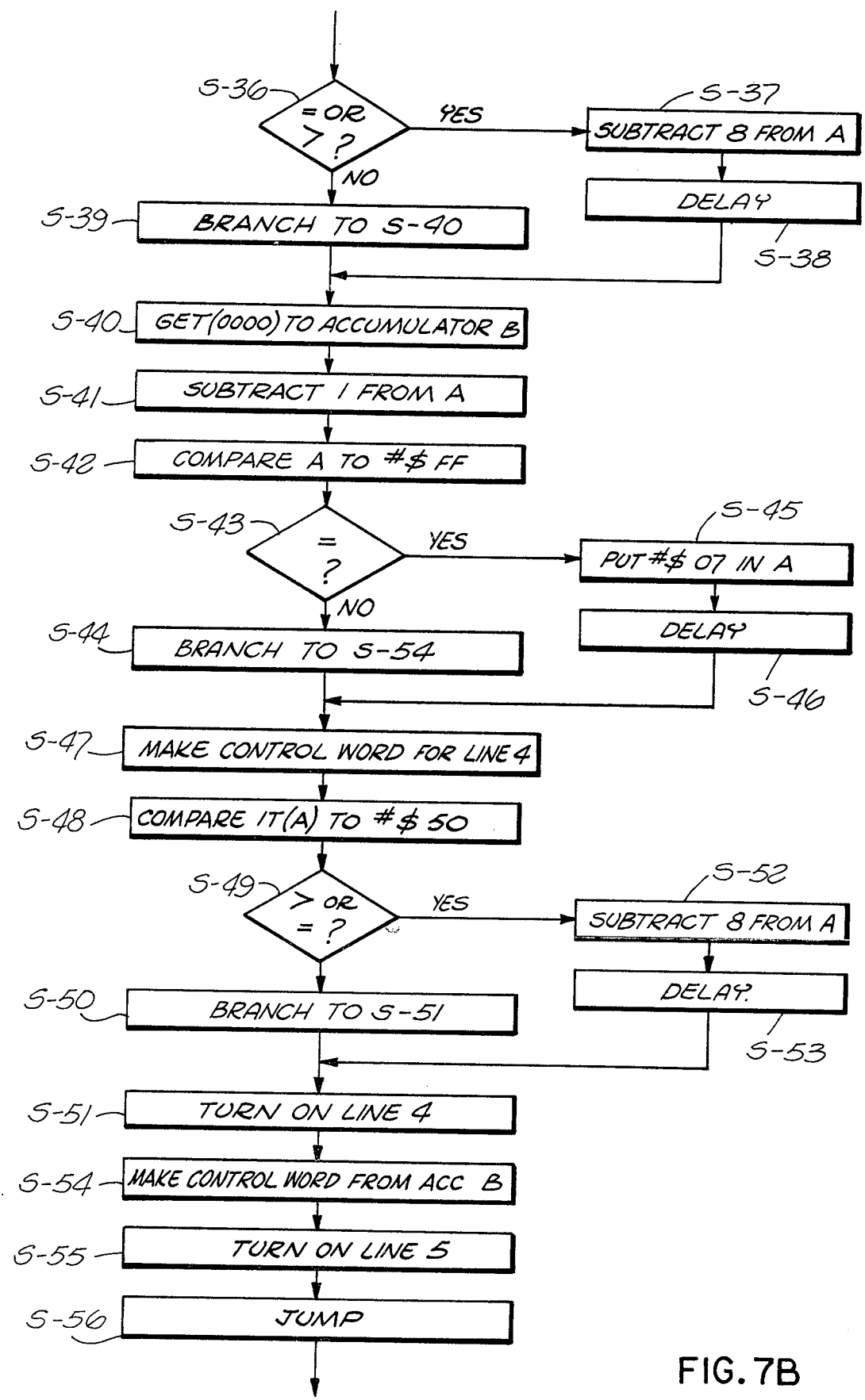

FIG. 5 discloses a flow chart of the output program whereby the computer 20 is enabled to control the operation of the disclosed system according to the invention. FIGS. 7a and 7b disclose another flow chart limited to a "delay" or charging subroutine that is nested within the main program. The delay subroutine, which is performed during the "excess" computation time (i.e. time not required to direct the ring switching network 16 for the purpose of generating a preselected output waveform), is utilized to determine and connect the optimum number of charge storage elements to charging current in accordance with the instantaneous value of the electrical energy produced by the generator 10. The amount of energy available will vary in response to the fluctuating character of the energy source which supplies the generator 10. (For example, the presence of clouds has a significant impact upon the output of a solar panel.)

The programmed control method as illustrated in FIGS. 5a through 5c is begun at step S-1 by the initializing of two separate indexes, one a "closure" index and the other a "feed" index (corresponding to the two types of switches, discussed above) in memory bytes of the computer 20. The indexes are utilized throughout to store switch locations within the EMF ring 16. The switch locations are transmitted to the system's switching hardware through the processing of a control word encoded as disclosed above. All series closure switches are normally conducting while all data switches are normally non-conducting. Thus, the designation, via control word, of a series closure switch will break a connection therethrough while the designation of a data switch will make a connection.

In step S-2, a further system procedure takes place in which the PIA 22, discussed above, is initialized to provide the output and input capability required for interaction of the computer 20 with the balance of the system. In step S-3, the closure switch index is incremented and the resultant value compared, in the following step, S-4, with the value "8". Keeping in mind the fact that closure switches are numbered in accordance with the adjacent charge storage element and that the charge storage elements of the EMF ring 16 are numbered 0 through 7, step S-4 merely serves as a check to avoid the introduction of data that does not correspond to the physical configuration of the ring 16.

Assuming a negative check, the appropriate series closure designation is utilized (after delay and jump step S-5) to form the control word identifying the series closure switch at step S-7. In the event that the check should disclose that the closure index is 8 or greater, the system is programmed to proceed to step S-6 wherein the charge storage element 32 (i.e. series closure switch 50) is arbitrarily designated, causing the switch to open upon transmission of the corresponding control word (formed at step S-7) to the indicated switch by means of the ring switching network 14. The opening of one of normally closed series closure switches "breaks" the EMF ring 16, at a point other than established at the time of power application to the system. This is a necessary first step that establishes a reference point for the purpose of developing electromotive potential differences across various combinations of the charge storage elements of the ring 16. In step S-8 the closure and feed indexes are compared and equalized since, at the beginning of the quarter of the a.c. cycle (the "ascending negative" portion) which is described herein, the ground reference of the output is chosen to correspond to the "break" in the EMF ring 16. The feed index memory byte thus contains a data switch indication that coincides with the point at which the ring 16 is "broken". Based upon this information, there is now formed, at step S-9, the control word that designates the data switch whose closure will make connection between the positive side of the charge storage element 32 and the one of the four output lines of the output bus 32 that serves as the reference (i.e. ground) over which the output voltage is measured. Since it is assumed in this example that an a.c. output is to be taken and that the first quarter-cycle of the output is negative-going, the first data switch indicated by the formation of the control word at step S-9 is that which connects the positive side of the charge storage element 32 to line "0". In the above-described control word notation, this switch is designated "00010000" and this control word is formed at step S-9. The "delay" subroutine to be disclosed in FIGS. 7a and 7b is undertaken by the computer during the idle computation time (time not needed for generation and processing of the above-described control word) in step S-10. At step S-11, the control word is applied to the system, through the B port of the PIA 22, and processed by means of the ring switching circuitry 14 to produce the switching function as designated.

The apparatus and method of the present invention are capable of generating an output waveform of any predetermined shape. The output is generated by sequential additions of the voltages across combination of charge storage elements in a predetermined manner. Assuming, for the present, that the individual charge storage elements are of equal capacities and have each been charged to render the voltages thereacross equal, arbitrary output waveforms are generated through the combined effects of (1) the additions of selected numbers of charge storage elements in a predetermined sequence as controlled by the digitial computer 20 and (2) the association with each such combination or sum of voltages across a particular number of charge storage elements of a programmed time delay. The combined effects of the former degree of freedom with respect to the amplitudes of the components of the output waveform and the latter degree of freedom with respect to the associated widths (in the time domain) of such amplitudes allows the generation of arbitrary output waveforms to deliver electrical energy of predetermined character to a output/utilization device 12 to an extent and in a manner not realized or capable of realization in the prior art.

At step S-12 the amount of delay time not utilized at step S-10 (to check the first charging input supplied to the system over lines "4" and "5" of the bus 24) is determined and, at step S-13, the computer 20 utilizes this time to determine and evaluate the charge available and to supply it to an optimum number of the charge storage elements of the EMF ring 16.

In step S-14 the computer directs closure of the data switch connecting the negative side of the charge storage element 34 to line "0".

The computer 20 retrieves the next program delay from an internal register at step S-15 and performs the delay at step S-16 while, at the same time, once again performing the delay charging subroutine of FIGS. 7a and 7b to charge an appropriate number of charge storage elements from the charging source 2 as determined therefrom.

A new control word is formed that defines the next data switch for closure as required for composition of the predetermined output waveform. In the present example, since an a.c. waveform is to be produced which requires the buildup of negative voltage during the initial quadrant of the cycle, the voltage drop across one additional charge storage element is next added at step S-17 by the programmed generation of the control word "00110000" that indicates that the new connection is to be made through the data switch connecting line 0 to the negative side of charge storage element 36 (number "1" on a scale of 0 to 7 progressing from charge storage element 34 clockwise around the ring 16).

Figure 6:
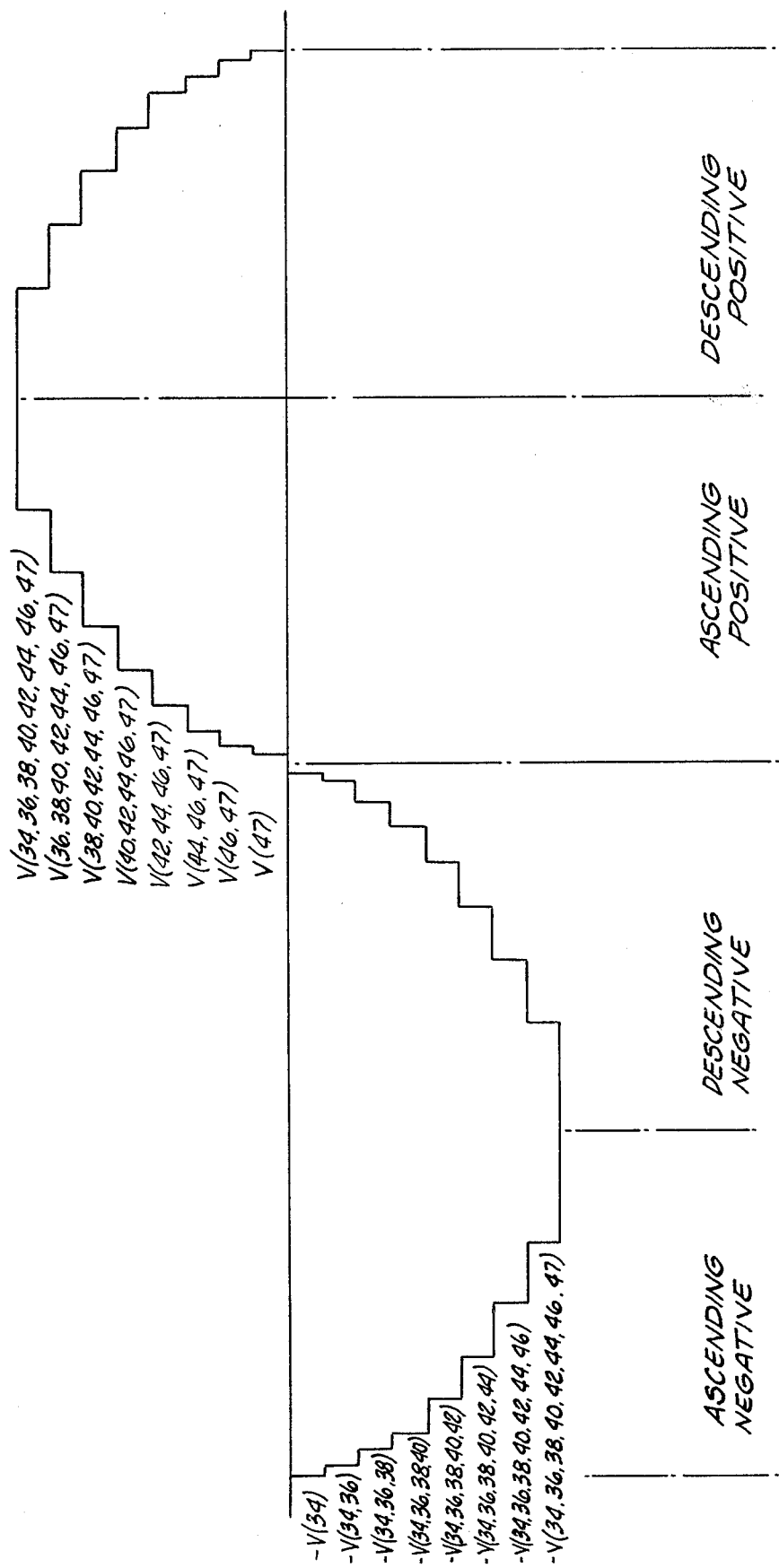
FIG. 6 is a graph which illustrates the generation of one a.c. cycle in accordance with the invention.

The method as above-described is continued through the generation of an entire cycle of the a.c. waveform. Steps S-11 through S-17 disclose the generation of the first two data points of the waveform. In FIG. 6, the results of these steps maybe seen in the output waveform as the voltages $-V(34)$ and $-V(34,36)$, the notation indicating that the first voltage is the drop across the charge storage element 34 and the second voltage representing the voltage drop across charge storage element 34 plus the voltage drop across charge storage element 36.

Additional programming is employed to assure that a waveform as indicated in FIG. 6 is produced. The a.c. cycle is generated in four major segments. As noted in FIG. 7, the first two data points, represent the values $-V(34)$ and $-V(34,36)$ of the "ascending negative" portion of the cycle that have been generated in steps S-11 through S-17 of the flow chart of FIGS. 5a and 5b. The additions of voltage drops in the ascending negative portion of the waveform are accomplished by a continuation of the method disclosed for the generation of the first two data points. New control words are successively generated defining the data switches that connect the negative sides of successive charge storage elements, proceeding clockwise around the ring 16, to the line 0 of the output bus 32. Since there exists a total of eight charge storage elements in the ring 16, additional programming is employed whereby the feed index is incremented with each new switch connection to assure that the addition of voltages in the ascending negative manner stops after the eighth charge storage element has been added.

The program then proceeds to the generation of the "descending negative" portion of the a.c. waveform. This is done by a reversal of the sequence of control words generated to form the ascending negative portion. There referenced voltage remains the same; that is, step S-11 is the same for both the ascending and descending negative portions of the cycle. By reversing the sequence, a counter-clockwise "rotation" (i.e. sequential closure of data switches) is effected within the ring 16 resulting in successive subtractions of voltage drops from the output waveform. Additional programming is utilized to keep track of the number of steps to provide an indication of the completion of the descending negative sequence. As was the case with respect to the ascending negative portion, the feed index is utilized for the purpose of keeping track of the number of voltage subtractions done during the descending negative portion of the cycle. Unlike the ascending negative portion, however, the feed index is decremented during this process, the completion of the descending negative portion being indicated when the feed index has reached "0" during the first cycle. At this point, the descending negative portion of the program is exited and the subroutine for generating the "ascending positive" portion of the a.c. cycle is entered. Both the ascending positive and the "descending positive" portions of the cycle require re-establishment of the ground reference to line 0 and taking of the positive voltage components of the output waveform on line 1. This is accomplished by the generation of a new control word at step S-9, indicating line 0 as the output of step S-11, followed by the subsequent switching of charge storage elements, starting with the element 46 and proceeding counterclockwise around the ring 16, as indicated on FIG. 6. The "descending positive" portion of the waveform involves the clockwise traverse of the ring 16 as above-described. As in the case of the negative portions of the a.c. cycle, the feed index is incremented and compared with the value "8" so that the computer 20 can determine the completion of the descending positive portion of the cycle; the index is decremented to "0" at the end of the descending positive portion of the first cycle.

At the end of the descending positive portion of the cycle, a new cycle is begun. The programmable control of switching sequences which has been seen to allow both clockwise and counterclockwise "rotations" about the EMF ring 16 additionally allows the initiation of cycle switching sequences at differing preselected points of the ring 16. This is accomplished through the sequential openings of series closure switches by addressing such sequence of switches through a instruction in control word format. The ring configuration, due to its symmetry, allows optimum distribution of the loading of its wiring through random, quasirandom or any other preselected sequence of alternation of the series closure switch opening at the initiation (or other point) of successive a.c. (or other waveform) cycles. The programmable nature of the present method enables the invention to implement any such sequence as desired.

As has been discussed and as can be seen in FIGS. 5a and 5b, charging current is admitted to the elements of the ring 16 during delay periods programmed into the output sequence in accordance with the shape of the preselected output waveform. FIGS. 7a and 7b disclose the subroutine undertaken by the computer 20 during such delay times whereby the amount of electrical energy produced by the generator 10 is continually evaluated; from this evaluation, the optimum number of charge storage elements to share the instantaneous charging current is determined. An appropriate control word is then transmitted to port B of the PIA 22, directing the connection of the charging source in a circuit such that charging current is shared by an optimum number of charge storage elements of the ring 16.

As has been mentioned above, the instantaneous value of the output of the generator 10 varies in accordance with the character of the electrical energy produced and with the condition of the environment; that is, the output of the generator may be inherently time-varying (in the case of an a.c. output) and also may be effected by the quality of the environment with regard to the generation of electricity. For instance, the output of a generator 10 which is configured to transform solar radiation into electricity is sensitive to the presence of clouds or the like which effect the input to the generator 10. The present invention optimizes charge storage within the EMF ring 16 by adjusting the flow of charging current (from one or more charging sources of the charge transfer bus 24). As is well known, optimum charge storage in terms of efficiency is achieved when the charging current is shared by that number of charge storage elements that is charged to its capacity. Partial charging of elements is inefficient.

The delay subroutine begins at step S-18 where an index register of the computer 20 is input into memory. At step S-19 the "A" port of the PIA 22 is initialized, allowing the computer 20, through the PIA, to receive input from charging source 1 (i.e. lines "4" and "5" of the charge transfer bus 24). At step S-20, the computer 20 is directed to accept the data (representing the output of the charging source 1 of the generator 10) from port A of the PIA 22.

Steps 21 through 24 effect a determination by the computer 20 as to whether the instantaneous value of the output of the generator 10 is positive, negative or "0". The value of the output generator 10 is converted into a 4-bit binary word by the analog-to-digital converter 18. Thus, the output of the generator 10 is presented to the computer 20 as any of 16 values in the range 0–15. As the output of the generator 10 could be either a positive or a negative voltage, the value, when converted into binary format by the converter 18 arbitrarily effects a translation of the zero voltage output to a mid-scale value of 8. Therefore, in making a determination of the sign of the instantaneous value of the output in steps S-21 through S-24, it is necessary to compare the output of the converter 18 at the A port of the PIA 22 to the value "8".

The computer is directed at step S-21 to make a comparison of the value of the output of the converter 18 to the value 8. The first comparison is made at step S-22 to determine whether the output of the generator 10 is zero volts. In the event that the value transmitted from the analog-to-digital converter 18 is "8" and, hence, the instantaneous output of the generator 10 is zero, the computer is directed to step S-25, a seventy-two cycle delay. This delay is programmed into the subroutine to equalize the duration of the subroutine regardless of the character of the instantaneous output of the generator 10. Upon a determination that the output of the generator 10 is zero volts, there is no charging current to be shared among the various charge storage elements, and no computations need be done to provide control words defining a charging circuit. Thus, the method returns to the output routine after the 72 cycle delay.

In the event that the comparison at step S-22 does not yield an afirmative result, the program proceeds to step S-23 wherein the computer 20 is directed to make an additional comparison of the output of the converter 18 to the value 8. The comparison, at step S-24, is undertaken for the purpose of determining which of the two remaining possibilities (i.e. a positive voltage output or a negative voltage output) is satisfied. In the event that the output of the converter 18 exceeds the value 8, the program proceeds to step S-33. Following the program to this point, step S-33 directs the subtraction of the value 8 from the charging data provided by the converter 18. This determines the absolute value of the voltage output of the generator 10 (the comparison made in the foregoing steps yielded only a relative value with respect to the number "8" for the purpose of determining the sign of the voltage).

The analog-to-digital converter 18 has been calibrated, with respect to the charge storage elements of the ring 16 to provide outputs normalized to the value of the capacity of a single charge storage element. Keeping in mind that the EMF ring 16 of the embodiment disclosed herein is configured of eight capacitors of identical value, and also keeping in mind the fact that the capacitors are serially connected, rendering their capacitances additive, the output or absolute value of the voltage determined at step S-33, represents the number of capacitors that can be fully charged by the instantaneous value of the output of the generator 10. In step S-34, this absolute value is added to the series closure index. The series closure index indicates the currently opened series closure switch. Thus, the sum of value determined at step S-33 and the value of the series closure index represents the number of the last charge storage element that can be fully charged in a series circuit including all other series closure elements between this element and the open series closure switch. In step S-35, the value or sum computed in the foregoing step is compared to "8". Unlike prior comparisons to this value, this comparison to the value "8" is undertaken as a result ot the fact that the EMF ring 16 of the embodiment disclosed herein contains a total of eight charge storage elements numbered "0" through "7" in a clockwise fashion beginning with the charge storage element 34. If, for example, series closure switch number "6" should be open and an absolute value of the output of the generator 10 of "4" is computed. the resultant total would not correspond to one of the eight numbered charge storage elements of the ring 16. Thus, the comparison at step S-35 is intended to normalize the resultant value to a scale of 0 through 7. At step S-36, the comparison is effected. In the event that the sum lies within the proper range, the computer is directed at step S-39 to proceed to step S-40, wherein the value in the series closure index is entered into an accumulator B of the computer 20. In the event that the value is found to exceed "7", the computer is directed to step S-37, wherein 8 is subtracted from the sum. After an equalizing delay at step S-38, the computer is directed again to step S-40 where the value is entered into accumulator B.

At step S-41 the value "1" is subtracted from the the series closure index. This step involves a "correction" due to the notation which has been adopted with respect to the EMF ring 16. The negative sides of the charge storage elements of the ring 16 are numbered one greater than the positive sides thereof in designating data switches. Steps S-42 through S-46 effect a "check" so that, in the event that the subtraction of step S-41 has yielded a negative number, the correct position in the EMF ring 16 will be designated by the addition of number "7" to the negative figure. In step S-47, the control word is formed which defines the connection of the negative side of the charge storage element that was determined at step S-34 to line 4 of the charge transfer bus 24; the appropriate control word will be of a form "XXXX1000". Steps S-48 through S-53 comprise a subsection of the method therein the control word derived is checked against its hexadecimal equivalent to determine that no errors have been introduced through shorts or otherwise in the system.

After the above-referenced check, the control word formed at step S-47 is utilized, through output port B of the PIA 22, to make the appropriate connection to line 4. At Step S-54, the appropriate control word is determined to connect the positive side of the charge storage element adjacent the open series closure switch to complete the charging circuit. At step S-55, the circuit is completed through transmission of the appropriate control word to port B. At step S-56, the computer 20 is directed to jump to an equalizing delay which, as discussed above, assures that the subroutine is performed in an identical number of machine cycles regardless of the instantaneous value of the output generator 10.

Steps S-25 through S-31 disclose the sequence of steps for computation of the charging circuit connection in the event that the instantaneous value of the output of the generator 10 is negative. These steps parallel the above-described steps with regard to a positive value and therefore need not be discussed in detail.

The above-described delay or charging routine relates to the transfer of charge from a single charging source to the EMF ring 16. The present invention is adapted to utilize two separate and interchangeable charging outputs from the generator 10. In the event that the output from charging source 2 on lines "6" and "7" of the charge transfer bus 24 is to be utilized, the delay subroutine of FIGS. 7a and 7b is simply repeated in alternate delay portions of the output program of FIGS. 5a and 5b for the alternate charging source. Some obvious modification must be made to the method, reflecting, for instance, the substitution of control words pertaining to lines "6" and "7" place of lines "4" and "5". Such modifications will be obvious to those skilled in the art. Likewise, multiple outputs of varying character may be simultaneously generated by obvious modification involving programming of the computer 20 to effect an internal "time-sharing" whereby the generation of control words pertaining to different sets of output lines is alternated to provide concurrent outputs of alternating current and direct current, for example, along the two sets of output lines to the bus 32. Though the character of the waveform illustrated in FIG. 6 is that of an alternating current output, a d.c. output may be generated in accordance with the teachings of the invention by establishing a constant distance (in numbers of voltage drops) between reference output line and the other output line. As the position of the open series closure element is moved about the EMF ring 16 (in some preselected manner), a new reference and, hence, a new position is established for connection to the remaining output line through conventional programming wherein a constant number of charge storage elements is added to the location of the reference. Other waveforms can be generated, regardless of shape, in accordance with appropriate time delays and numbers of charge storage elements for determining the widths and amplitudes, respectively, of the component portions of the waveforms.

Thus, it is seen that there has been brought to the energy conversion art new and improved apparatus for transforming forces into electrical energy. Utilizing apparatus according to the present invention, one may overcome many inherent obstacles of the prior art utilizing the flexibility accorded the incorporation of computerized control into the system to generate multiple outputs of preselected character useful to the requirements of specific utilization apparatus. The energy generated is efficiently converted to provide the user with a readily flexible and efficient energy conversion system. In addition, the invention allows application of charge inputs and voltage outputs spaced apart in time. Thus this invention lends itself to off-hour power storage and usage enhancing its use, for example in conjunction with electrical or "hybird" automobiles.

What is claimed:

1. A system for converting force into electrical energy of preselected character comprising, in combination:
    (a) a generator for producing electrical energy of a first character in response to said force;
    (b) charge storage means including a plurality of charge storage elements;
    (c) a first bus comprising at least one conductor providing an electrical path between the output of said generator and said charge storage means;
    (d) a second bus comprising at least one conductor in electrical connection to said charge storage means;
    (e) a switching network to control the flow of electrical energy from said first bus to the charge storage elements of said charge storage means and to control the flow of charge from said charge storage elements to said second bus; and
    (f) programmable apparatus to control said switching network comprising, in combination:
        (i) a digital computer; and
        (ii) input-output means coupled thereto;
    said apparatus being programmed to couple said charge storage elements to said first bus in response to the instantaneous value of the output of said generator.

2. A system for converting force into electrical energy of preselected character comprising, in combination:
    (a) a generator for producing electrical energy of a first character in response to said force;
    (b) charge storage means including a plurality of charge storage elements;
    (c) a first bus comprising at least one conductor providing an electrical path between the output of said generator and said charge storage means;
    (d) a second bus comprising at least one conductor in electrical connection to said charge storage means;
    (e) a switching network to control the flow of electrical energy from said first bus to the charge storage elements of said charge storage means and to control the flow of charge from said charge storage elements to said second bus; and
    (f) programmable apparatus to control said switching network comprising, in combination:
        (i) a digital computer; and
        (ii) input-output means coupled thereto;
    (g) said apparatus being programmed to couple the charge storage elements to said second bus according to a preselected sequence so that an electrical waveform of preselected character is provided on said second bus.

3. A system as defined in claim 2 wherein said charge storage means is further characterized in that said plurality of charge storage elements is serially interconnected in a ring-like configuration.

4. A system as defined in claim 3 wherein said switching network further comprises:
    (a) a series closure switch positioned between each pair of charge storage elements; and (b) a data switch for regulating the flow of current between the charge storage elements and the conductors of said first bus and of said second bus;

(c) all data switches and all series closure switches of said switching network being controlled by said digital computer.

5. A system as defined in claim 4 wherein said switching network additionally includes means for decoding a control word to provide control signals for said switches.

6. A system as defined in claim 5 wherein said switching network additionally includes a plurality of latches.

7. A system as defined in claim 6 wherein said switches are optoisolated.

8. A system as defined in claim 7 wherein said generator is a solar panel.

9. A system as defined in claim 7 wherein said generator is a windmill.

10. A system as defined in claim 7 wherein said charge storage elements are capacitors.

11. A system as defined in claim 7 wherein said charge storage elements are batteries.

12. Apparatus for generating an electrical waveform of preselected character comprising, in combination:
    (a) an output port comprising at least one pair of conductors;
    (b) means for storing electrical energy comprising a plurality of serially connected charge storage elements arranged in a ring-like configuration; and
    (c) programmable apparatus for sequentially coupling said charge storage elements to said output port in accordance with a preselected programmed sequence so that an electrical waveform of preselected character is produced at said port, said programmable apparatus including:
        (i) a digital computer including input means and output means; and
        (ii) a switching network in electrical connection with said means for storing electrical energy and with said digital computer;
        (iii) said switching network being responsive to said computer to provide at least one electrical signal to said means for storing electrical energy according to said programmed preselected sequence.

13. Apparatus for generating an electrical waveform as defined in claim 12 wherein said switching network further comprises:
    (a) at least one series closure switch to provide a switchable electrical connection between each pair of charge storage elements of said ring-like configuration; and
    (b) at least one data switch to provide switchable electrical connection between each charge storage element and each conductor of said output port.

14. A switching network for controlling the discharging of an array of charge storage elements onto a first bus comprising a first set of conductors and the charging of said elements by means of current carried on a second bus comprising a second set of conductors in response to control words generated by means of a digital computer comprising, in combination:
    (a) a plurality of conductors to interconnect said charge storage elements and to connect said charge storage elements to said sets of conductors;
    (b) a series closure switch positioned to regulate electrical coupling between said charge storage elements;
    (c) a data switch positioned to regulate the flow of current between each charge storage element, and each conductor of said first bus and said second bus;
    (d) means for decoding said control word into a plurality of control signals; and
    (e) means for transmitting said control signal to said switches.

15. A switching network as defined in claim 14 wherein said means for transmitting said control signal includes a plurality of latches.

16. A method generating an electrical signal having a waveform of preselected character comprising the steps of:
    (a) arranging a plurality of charge storage elements into a ring-like configuration;
    (b) providing a switchable connection between each pair of said charge storage elements;
    (c) arranging a plurality of conductors into an output port;
    (d) providing a switchable connection between each of said charge storage elements and said conductors;
    (e) programmably controlling said switches in accordance with a preselected switching sequence characterized by the generation of a sequence of control words, each of said control words defining one switch so that a preselected sequence of connections is made between said charge storage elements and said conductors; and
    (f) programmably associating a time delay with each of said connections to provide an electrical signal having a waveform of preselected characters at said output port.

17. A method as defined in claim 16 wherein said step of programmably controlling said switches further includes the step of decoding each of said control words to that the switches thereby defined are actuated in response thereto.

* * * * *

UNITED STATES PATENT AND TRADEMARK OFFICE
CERTIFICATE OF CORRECTION

PATENT NO. : 4,476,520

DATED : October 9, 1984

INVENTOR(S) : Elbert M. Gallemore

It is certified that error appears in the above-identified patent and that said Letters Patent is hereby corrected as shown below:

Column 4, line 67, "porduced" should read -- produced --.

Column 8, line 57, "differes" should read -- differs --.

Signed and Sealed this

Eighteenth Day of June 1985

[SEAL]

Attest:

DONALD J. QUIGG

Attesting Officer  Acting Commissioner of Patents and Trademarks